Aug. 12, 1941.  E. SCHWARZ  2,252,582
REINFORCING MEANS FOR LAMP SHADES
Filed March 4, 1939
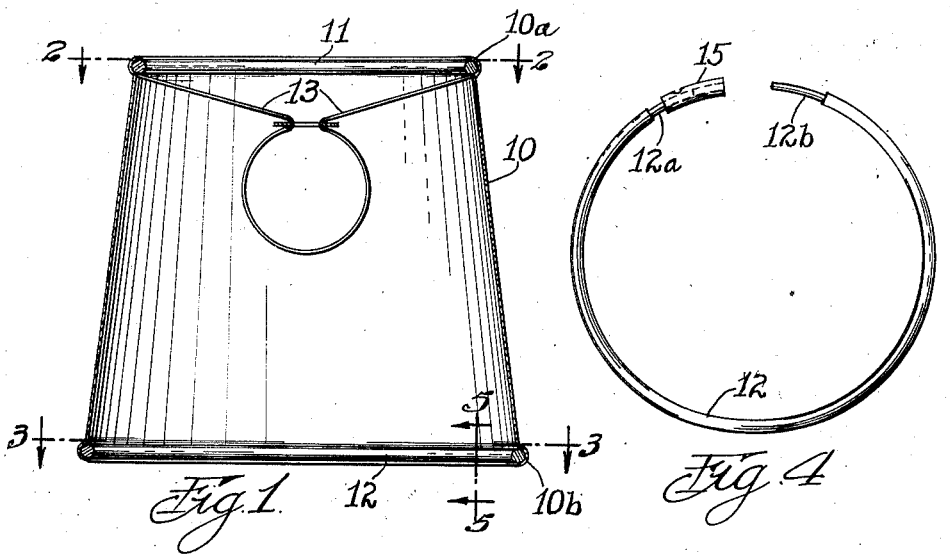
Fig. 1.
Fig. 4.
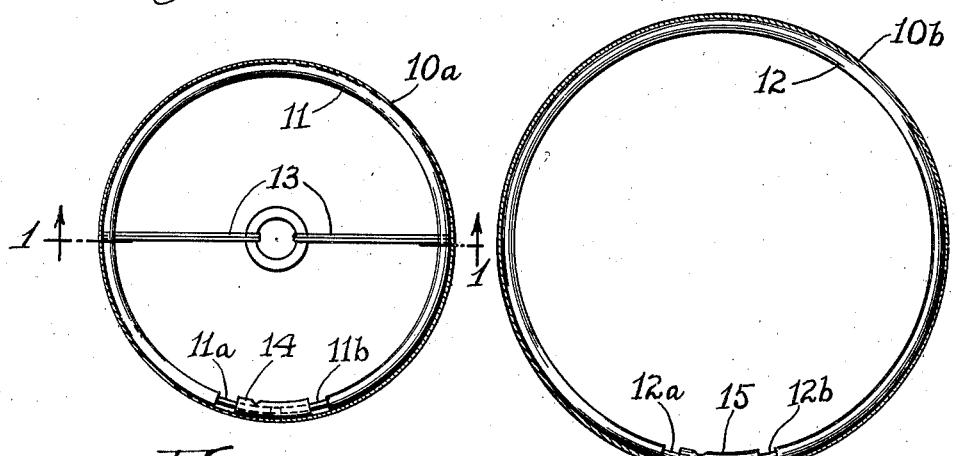
Fig. 2.
Fig. 3.
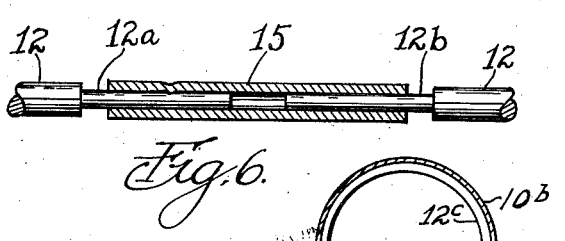
Fig. 6.
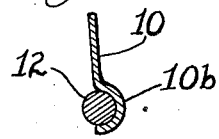
Fig. 5.
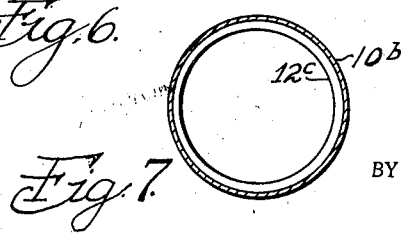
Fig. 7.
INVENTOR.
EUGENE SCHWARZ
BY Albert E. Bell
ATTORNEY.

Patented Aug. 12, 1941

2,252,582

UNITED STATES PATENT OFFICE 2,252,582

REINFORCING MEANS FOR LAMP SHADES

Eugene Schwarz, Alexandria, Ind., assignor to The Mantle Lamp Company of America, Chicago, Ill., a corporation of Illinois Application March 4, 1939, Serial No. 259,765

8 Claims. (Cl. 240—108)

This invention pertains to lamp shades for use with lamps generally, and it includes a construction by which reinforcing rings or members may be employed with the shade material, to hold the shade material in desired shape, without attaching the reinforcing means or members to the shade material. More specifically, the invention provides for forming retaining grooves in the upper and lower edge portions of the shade material, to constitute retaining seats for rings of suitable stiffening material, so that the rings will impart to the shade material their own conformation, and afford a substantial reinforcement for the ends of the shade material.

The invention is applicable to any shade material that is sufficiently self-sustainnig to carry the grooves referred to, in such a manner that the grooves will retain their conformation in the ordinary usage to which the shade is put, whether the shade material is sufficiently substantial to otherwise retain its form or not. Examples of suitable material are parchment paper, sheet Celluloid and stiffened fabric. With shade material of the kind referred to which is self-sustaining, as far as the reinforcing grooves are concerned, the stiffening or reinforcing members may conveniently consist of rings of metal or other suitable material, constructed to closely fit the grooves, said rings in some cases being insertable into the grooves by providing expansion joints in the rings and constructing the rings so that they tend to increase in size when unrestrained, although in other cases solid or continuous rings of metal or other suitable material may be used and inserted into the grooves of the shade material, by springing the shade material around each ring at one or more points. The essential feature of the invention is that the reinforcement is effected by a close and preferably a pressure engagement of the reinforcing member with a groove in the shade material, said groove being so conformed that the reinforcing member is positively and snugly retained in the groove against displacement for any usage to which the shade may ordinarily be subjected, without the use of any additional retaining means whatsoever.

In case it is desired to ornament the reinforced ends of the shade, strips of finishing material may be employed, which cover the groove portions and also the reinforcing members, but any such ornamentation is not relied upon, nor does it substantially contribute in holding the reinforcing members in the grooves referred to as being formed in the shade material.

The invention will be best understood by reference to the accompanying drawing illustrating a preferred embodiment thereof, in which:

Fig. 1 illustrates a shade in accordance with the invention, in vertical, central, sectional view, Fig. 2 is a horizontal, sectional view through the construction, taken along the line 2—2 in Fig. 1, Fig. 3 is a horizontal, sectional view through the construction, taken along the line 3—3 in Fig. 1, Fig. 4 is a plan view of one of the reinforcing rings or members in freed condition when removed from the shade, Fig. 5 is a vertical, sectional view of a part of the construction shown in Fig. 1, taken along the line 5—5 in Fig. 1, Fig. 6 is a longitudinal, sectional view to an enlarged scale, of the expansion joint used with the reinforcing member illustrated in Fig. 4, and Fig. 7 shows in a view similar to Fig. 3, and to a reduced scale, a modified construction of the reinforcing rings.

Similar numerals refer to similar parts throughout the several views.

As shown in Fig. 1, the shade consists of a sheet of material 10 having a conical conformation of small taper, and provided with grooved end portions 10a and 10b containing reinforcing rings 11 and 12. The upper ring 11 has secured to it, a spider or supporting wires 13 for engaging a lamp or other support to hold the shade in desired position when in use. The sheet material 10 is sufficiently self-sustaining so that grooved portions may be formed therein and retain their conformation after the forming operation, as a result of which said grooved portions will have stable engagement with the reinforcing rings or members 11 and 12 after they are located in said grooved portions. The material of each of the grooved portions extends substantially half way around the side of the corresponding one of the reinforcing rings or members 11 and 12, as a result of which it is not possible to insert the ring into the grooved portion or remove it therefrom, without either changing the size of the ring or springing part of the grooved portion to slip it over the ring.

With the construction illustrated in the drawing, the ring 11 as shown in Fig. 2, is provided with portions 11a and 11b at its ends which are of reduced diameter, the portion 11a carrying and having secured thereto a sleeve member 14, and the end portion 11b of the ring being a sliding fit in the other end portion of said sleeve.

The ring 11 is preferably made of resilient material having a substantial spring action, for example spring metal, and is so conformed that when unrestrained, it is substantially larger in diameter than the grooved portion 10a in which it is to be retained. To mount the ring 11 in the groove 10a, the end portion 11b is inserted in the sleeve 14 and the ring is compressed until it will slip into the grooved portion 10a, and the ring is then released so that its expansive tendency will press it firmly into the grooved portion 10a, thereby imparting to the corresponding end of the shade, the general conformation of the ring 11. The ring 12, as shown in Fig. 3, is similarly formed to engage the grooved portion 10b, said ring 12 having end portions 12a and 12b of reduced diameter and provided with a sleeve 15 which is secured to the ring portion 12a, the other end of the sleeve being a sliding fit on the end portion 12b of the ring, and the ring being constructed and operating in connection with the grooved portion 10b, as above described for the ring 11 and the grooved portion 10a.

The ring 12 is illustrated in Fig. 4 in its free or expanded condition removed from the shade, to show the compression required to place the ring in the condition illustrated in Figs. 1 and 3, so that the expansive tendency of the ring will firmly hold it in the grooved portion 10b and impart the general conformation of the ring to the corresponding portion of the shade. The extent to which the grooved portion 10b embraces the ring 12 is illustrated in Fig. 5, and the relation of the end portions 12a and 12b of the ring 12 to the sleeve 15, when the ring is in position in the shade, is illustrated in Fig. 6.

Where the shade material is sufficiently resilient to permit it, the reinforcing rings may be solid and without joints, as shown in Fig. 7 for the ring 12c, and may be forced into engagement with the grooved portions of the shade by stretching the edges of the grooved portions over the rings. The structure illustrated in Fig. 7 has the same appearance in vertical central sectional view as illustrated in Fig. 1, and it will be understood that both the upper and lower reinforcing rings of the complete structure may be of the construction illustrated for the ring 12c in Fig. 7. It will be observed that the essential feature of the invention is that the shade material shall be grooved circumferentially and that it shall have tight engagement with a reinforcing ring or member holding the shade material in the conformation of said ring or member, as a result of the interaction between the grooved portion and the reinforcing ring or member tending to firmly press the two parts together, regardless of whether the grooved portion and the reinforcing ring or member are formed as specifically described, or otherwise.

If desired, the shade may be used without ornamentation, or, if preferred, the grooved portions of the shade may be ornamented by the use of additional strips or tapes of ornamental material which may, if desired, cover the grooved portions and also the reinforcing rings or members, but if so used, the ornamentation need form no part of the shade reinforcement and the ornamentation further need not be depended upon to hold the reinforcing rings or members tightly in engagement with the grooved portions of the shade. Thus the invention provides a simple and inexpensive means for imparting stability to shade material that otherwise would not have sufficient stiffness to maintain it in a desired general conformation, although small areas of the shade material might have the requisite stability to positively form and maintain the grooved portions referred to. It is to be understood that the terms "shade material," "formed sheet of shade material" and "stable shade material" used throughout the specification and appended claims, comprehend and include paper, parchment, Celluloid, stiffened fabric and similar sheet material.

While I have shown my invention in the particular embodiment above described, it will be understood that I do not limit myself thereto as I may employ equivalents thereof without departing from the scope of the appended claims.

Having thus described my invention, what I claim is:

1. In a shade construction, the combination of a formed sheet of shade material of such stiffness as to retain its axial conformation unaided and to be flexible radially, said sheet having a groove formed in one of its end portions with upper and lower edge portions of different sizes than the bottom of said groove, said groove having a wall of a single thickness of said sheet, and a resilient shaping ring in said groove having a radial form desired for the shade, and pressing tightly and directly against the bottom surface thereof and held in said groove by the upper and lower edge portions of said groove, whereby the desired radial form is imparted to said formed sheet by said ring.

2. In a shade construction, the combination of a formed sheet of shade material of such stiffness as to retain its axial conformation unaided and to be flexible radially, said sheet having a groove formed in one of its end portions with upper and lower edge portions of different sizes than the bottom of said groove, said groove having a wall of a single thickness of said sheet, and a resilient shaping ring in said groove having a radial form desired for the shade, and pressing directly against the bottom surface thereof and held in said groove by the upper and lower edge portions of said groove, whereby the desired radial form is imparted to said formed sheet by said ring, said ring comprising a metallic wire held in stressed condition in said groove by the spring tendency of said ring.

3. In a shade construction, the combination of a formed sheet of stable shade material of such stiffness as to retain its axial conformation unaided and to be flexible radially, said sheet having a circumferential groove formed around its end, said groove having a wall of a single thickness of said sheet, a shaping ring in said groove pressing tightly and directly against the bottom thereof, said ring comprising a metallic wire held in stressed condition in said groove by the spring tendency of said ring, and a sleeve holding the end portions of said ring in alignment with each other and having sliding engagement with said ring, said sleeve having an outer diameter substantially equal to the diameter of the material of said ring outside of said sleeve.

4. In a shade construction, the combination of a formed sheet of shade material of such stiffness as to retain its axial conformation unaided and to be flexible radially, said sheet having a groove formed in one of its end portions with upper and lower edge portions of different sizes than the bottom of said groove, said groove having a wall of a single thickness of said sheet, and a shaping ring in said groove and pressing directly against the bottom surface thereof and held in said groove by the upper and lower edge portions of said groove, said ring comprising a metallic wire held in stressed condition in said groove by the spring tendency of said ring, and a sleeve holding the end portions of said ring in alignment with each other and having sliding engagement with said ring, said sleeve having an outer diameter substantially equal to the diameter of the material of said ring outside of said sleeve.

5. In a shade construction, the combination of a formed sheet of shade material of such stiffness as to retain its axial conformation unaided and to be flexible radially, said sheet having a groove formed in one of its end portions with upper and lower edge portions of different sizes than the bottom of said groove, said groove having a wall of a single thickness of said sheet, a resilient shaping ring in said groove having a radial form desired for the shade, and pressing tightly and directly against the bottom surface thereof and held in said groove by the upper and lower edge portions of said groove, whereby the desired radial form is imparted to said formed sheet by said ring, and a supporting spider connected with said ring.

6. In a shade construction, the combination of a formed sheet of stable shade material of such stiffness as to retain its axial conformation unaided and to be flexible radially, said sheet having a circumferential groove formed around its end, said groove having a wall of a single thickness of said sheet, a shaping ring in said groove pressing tightly and directly against the bottom thereof, said ring comprising a metallic wire held in stressed condition in said groove by the spring tendency of said ring, a sleeve holding the end portions of said ring in alignment with each other and having sliding engagement with said ring, said sleeve having an outer diameter substantially equal to the diameter of the material of said ring outside of said sleeve, and a supporting spider connected with said ring.

7. In a shade construction, the combination of a formed sheet of stable shade material having a circumferential groove formed around its end, said groove having a wall of a single thickness of said sheet, and a metallic shaping ring in said groove and pressing tightly and directly against the bottom thereof, said shade material being sufficiently rigid axially of the shade to support the shade in that direction and being sufficiently resilient to require radial reinforcement, the resilience of the shade material being sufficient to be distended at the edge of the circumferential groove to pass over the ring in assembling the latter in place in the groove and to hold the ring in the groove for the assembled condition of the shade construction.

8. In a shade construction, the combination of a formed sheet of stable shade material having a circumferential groove formed around its end, and a rigid metallic shaping ring in said groove and pressing tightly against the bottom thereof, said shade material being sufficiently rigid axially of the shade to support the shade in that direction and being sufficiently resilient to require radial reinforcement, the resilience of the shade material being sufficient to be distended at the edge of the circumferential groove to pass over the ring in assembling the latter in place in the groove and to hold the ring in the groove for the assembled condition of the shade construction, said ring being of solid and continuous construction.

EUGENE SCHWARZ.